US006984251B2

(12) United States Patent
Kitazawa et al.

(10) Patent No.: US 6,984,251 B2
(45) Date of Patent: Jan. 10, 2006

(54) ALKALINE STORAGE BATTERY AND PROCESS FOR PRODUCING THE SAME

(75) Inventors: Yasushi Kitazawa, Yokohama (JP); Kenichi Aoki, Chigasaki (JP); Hideo Kasahara, Neyagawa (JP); Gota Asano, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 206 days.

(21) Appl. No.: 10/232,735

(22) Filed: Sep. 3, 2002

(65) Prior Publication Data

US 2003/0068554 A1 Apr. 10, 2003

(30) Foreign Application Priority Data

Sep. 28, 2001 (JP) .............................. 2001-301754

(51) Int. Cl.
*H01M 10/04* (2006.01)
(52) U.S. Cl. .................................................. 29/623.3
(58) Field of Classification Search ................ 429/235; 29/623.3
See application file for complete search history.

(56) References Cited

U.S. PATENT DOCUMENTS 5,518,840 A * 5/1996 Verhoog et al. .......... 429/235 X
5,721,073 A * 2/1998 Matumura et al. ........... 429/233
6,117,592 A * 9/2000 Hoshino et al. ............. 429/235
6,485,865 B1 * 11/2002 Sugikawa ................... 429/235
2002/0187397 A1 * 12/2002 Hrinevich et al. ....... 429/235 X

FOREIGN PATENT DOCUMENTS

| CN | 1277466 | 12/2000 |
| JP | 54-120837 | 9/1979 |
| JP | 5-205746 | 8/1993 |
| JP | 9-106814 | 4/1997 |
| JP | 11-185732 | 7/1999 |

OTHER PUBLICATIONS

Chinese Office Action dated Dec. 3, 2004 with English translation.

* cited by examiner

*Primary Examiner*—Stephen J. Kalafut
(74) *Attorney, Agent, or Firm*—Stevens, Davis, Miller & Mosher, LLP

(57) ABSTRACT

An alkaline storage battery comprising an electrode assembly housed in a vessel, said electrode assembly comprising a positive electrode plate obtained by filling an active material comprising nickel hydroxide as the principal component into a metallic porous body substrate having three-dimensionally continuous space, followed by pressing, and a negative electrode plate which are opposed to each other with a separator placed therebetween, wherein said positive electrode plate used has been prepared by filling the active material into a plurality of the substrates and then placing at least two of the resulting positive electrode plates one upon another and pressing them to give a single positive electrode plate.

1 Claim, 2 Drawing Sheets

ALKALINE STORAGE BATTERY AND PROCESS FOR PRODUCING THE SAME

BACKGROUND OF THE INVENTION

1. Field of the Invention

This invention relates to an alkaline storage battery, typically represented by a nickel-hydrogen storage battery and nickel-cadmium storage battery, which has an enhanced capacity and to a process for producing the same.

2. Description of Related Art

In recent years, with the rapid progress of widespread use of portable and/or cordless instruments, a demand is increasing for secondary batteries which are small in size, light in weight and have a high energy density to serve as the power source of such instruments. On the market, secondary batteries which have a particularly high capacity and are inexpensive are awaited. Accordingly, capacity increase, cost reduction and improvement of reliability on the market are eagerly awaited for alkaline storage batteries represented by nickel-hydrogen storage batteries and nickel-cadmium storage batteries.

Such alkaline storage batteries have previously been constructed by housing in a battery case an electrode assembly constructed such that a positive electrode plate comprising nickel hydroxide as the principal component and a negative electrode plate are placed to oppose each other with an electrically insulating separator placed therebetween, then pouring a predetermined amount of an alkaline electrolyte into the electrode assembly, and thereafter tightly closing the upper part of the battery case with a sealing plate which also serves as the terminal of either the positive or the negative electrode.

The positive electrode plate herein has hitherto been prepared by preparing an active material paste by kneading an active material comprising nickel hydroxide as the principal component together with water and a water-soluble bonding agent, filling the active material paste in a metallic porous body comprising nickel, followed by drying, and then pressing the resulting electrode to make the thickness uniform and at the same time to increase the packing density of the active material. This process has been disclosed, for example, in JP-A-9-106814.

To secure a necessary amount of positive electrode active material for attaining an increased capacity, the positive electrode plate has been prepared by using a metallic porous body comprising nickel having an increased thickness.

However, when the thickness of the metallic porous body is increased to attain an increased capacity, the degree of difficulty in preparation of the porous body increases, leading to increase in cost. Since the positive electrode is, by nature, of a structural material having a low degree of freedom from deformation by bending, when the thickness of the metallic porous body is increased, the cracking and breaking of the metallic porous body and the peeling and separation of the active material become apt to occur at the positive electrode plate preparation step. Consequently, there arises a possible risk of the active material which has fallen off breaking through the separator present between the positive electrode plate and the negative electrode plate to cause internal short-circuit between the positive electrode and the negative electrode.

Furthermore, since the uniformity of packing of the active material paste decreases when the thickness of the metallic porous body is increased, at the paste where the packing of the active material is dense, the foamed metallic porous body is apt to undergo cracking and breaking at the time when the positive electrode plate is pressed to attain the desired thickness; at the parts where the packing of the active material is sparse, on the other hand, the skeleton of the metallic porous body is apt to be bared. Therefore, there arises a possible danger of the internal short-circuit occurring owing to contact of the positive electrode plate with the negative electrode plate caused by the broken skeleton or bared skeleton breaking through the separator.

Moreover, a thick metallic porous body is difficulty penetrated to the inside by plating, hence the internal skeleton tends to be thin, so that the use of a thick-type metallic porous body is liable to cause lowering of discharge characteristics.

BRIEF SUMMARY OF THE INVENTION

To solve the above-mentioned problems, in the alkaline storage battery of this invention, an electrode is prepared first by preparing an active material paste by kneading an active material comprising nickel hydroxide as the principal component together with water and a bonding agent and then filling the paste into a metallic porous body having three-dimensionally continuous space, or alternatively an electrode is prepared by filling active material powder into the metallic porous body, and thereafter at least two electrode thus prepared are placed one upon another and pressed to obtain a single electrode.

At this time, since at least two electrodes are piled to give a single electrode, the amount of the active material paste or the active material powder filled into the metallic porous body is selected at least an amount of the active material required at the time of completion divided by the number of electrodes to be piled and, at the same time, the thickness of the individual metallic porous body is made small so as to give the necessary capacity at the time of completion.

The positive electrode plate thus prepared and a negative electrode plate are placed to oppose each other with a separator interposed therebetween, to construct an electrode assembly. The electrode assembly is housed in a case, an alkaline electrolyte is poured into the case, and the upper part of the case is tightly closed, thus to construct an alkaline storage battery.

In the above-mentioned manner, the active material can be filled till to attain a capacity which has hitherto been deemed difficult and, at the same time, the break of the metallic porous body and the non-uniform packing of the active material, which have been serious problems, can be suppressed, an enhanced capacity can be attained, and thus a battery of which the fluctuation of performance characteristics is small can be designed.

DETAILED DESCRIPTION OF THE INVENTION

Figure 1:
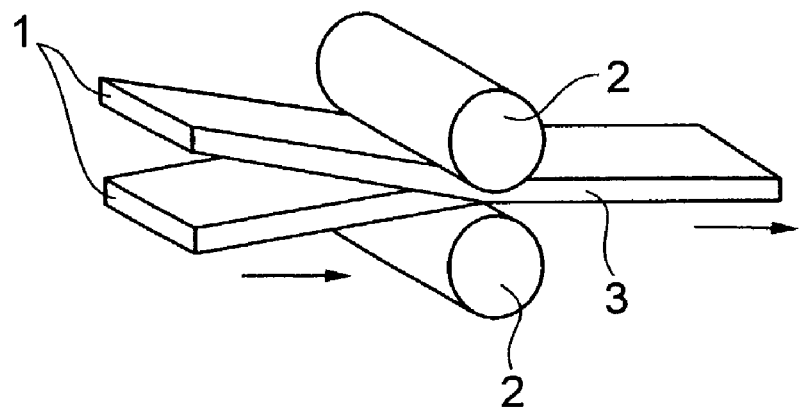
FIG. 1 is a schematic view showing a mechanism for forming two positive electrode plates into a single plate in Example of this invention.

The alkaline storage battery of this invention is one comprising an electrode assembly housed in a vessel, said electrode assembly comprising a positive electrode plate obtained by filling an active material comprising nickel hydroxide as the principal component into a metallic porous body having three-dimensionally continuous space, followed by pressing, and a negative electrode plate which are opposed to each other with a separator placed therebetween, wherein said positive electrode plate used has been prepared by filling the active material into a plurality of the substrates and then placing at least two of the resulting positive electrode plates one upon another and pressing them to give a single positive electrode plate.

In this way, since the thickness of the metallic porous body can be decreased, the degree of difficulty in preparation thereof is decreased, and the packing uniformity in filling the active material is improved. The occurrence of cracking and breaking of the metallic porous body is suppressed and resultantly the occurrence of interval short-circuit due to contact of the positive electrode plate with the negative electrode plate is suppressed and the yield in preparation is improved.

The "single positive electrode plate" referred to above means a positive electrode plate which has been prepared by forming at least two positive electrode plates into one body by pressing and which does not undergo peeling or separation at least during the preparation, preferably during the use of a battery. In forming the electrode plates into one body, besides pressing, auxiliary means, for example combined use of an adhesive, may be employed.

The process for producing an alkaline storage battery according to this invention comprises an active material filling step of filling an active material paste prepared by kneading an active material comprising nickel hydroxide as the principal component together with water and a bonding agent, or powder of the active material, into a metallic porous body substrate having three-dimensionally continuous space to form a positive electrode plate, a step of placing at least two positive electrode plates obtained as above one upon another and pressing them to give a single positive electrode plate of a desired thickness, a step of constructing an electrode assembly by placing the resulting positive electrode plate and a negative electrode plate so as to oppose each other with a separator interposed therebetween, and a step of housing the electrode assembly in a vessel.

For the metallic porous body, metallic nickel is preferably used. The metallic nickel used is, for example, foamed metallic nickel and nonwoven fabric of nickel fiber having three-dimensionally continuous space. By use of foamed metallic nickel, alkaline storage batteries excellent in charge and discharge characteristics and life characteristics can be obtained.

The pore diameter, porosity and thickness of the metallic porous body, and the amount of active material filled per unit area are not particularly limited, and may be appropriately determined according to the amount of the active material required and the number of electrode plates to be laminated.

Preferably, the pore diameter of the metallic porous body is 200 $\mu$m–800 $\mu$m, the thickness is 0.5 mm–3.0 mm and the amount of the metallic porous body per unit area is 100 $g/m^2$–800 $g/m^2$, the capacity density of the active material filled in the porous body is 600 mAh–800 mAh, because then the active material scarcely falls off or peels off from the electrode plate even when two or more positive electrode plates are placed one upon another and pressed together.

The electrode plate may be prepared either by filling an active material paste obtained by kneading an active material, water and a bonding agent (the mixing ratio is appropriately determined) or by directly filling active material powder. The former is more easy to handle.

The method of filling is not particularly limited and may be, for example, a method of filling a paste-formed active material by applying vibration thereto, a method of rubbing-in a paste-formed active material with a doctor knife or the like, a method of filling by contacting a paste-formed active material onto one side of a metallic substrate and sucking the material from the other side, a method of blowing a paste-formed active material against a metallic substrate by injecting it from a nozzle, and a method of directly filling active material powder in the same manner as described above.

The method used for placing at least two positive electrode plates one upon another and applying pressure thereto is not particularly limited. The pressure may be appropriately selected according to the desired thickness of the electrode plate after pressing. In the case of roller pressing, it is preferable to press by using a roller press with a roller diameter $\phi$ of 300 mm–800 mm at an applied pressure of 5 MPa–100 MPa. The gap of the pressing roller is appropriately determined according to the thickness of the positive electrode plate before pressing and the desired thickness of the electrode plate after pressing. The number of the electrode plates to be piled also is not particularly limited, but in view of simplicity of the process step, it is preferably 2 to 4, more preferably 2.

Having thus generally described the present invention, the following specific examples are provided to illustrate the invention. The examples are not intended to limit the scope of the invention in any way.

EXAMPLE

To 100% by weight of nickel hydroxide were added 0.2% by weight of carboxymethyl cellulose as a bonding agent and water in such an amount as to be 20–24% by weight relative to the whole paste, and the mixture was kneaded to obtain an active material paste.

The active material paste was filled into a strip-formed metallic porous body having three-dimensionally continuous space and a thickness of 1.15 mm, and dried to obtain an active material-filled substrate 1. Then, as shown in FIG. 1, press rollers 2 each made of steel and having a diameter of 450 mm were arranged on the upper side and the lower side with a gap between the upper side and the lower side press rollers 2 set at 1.1 mm, two active material-filled substrates 1 obtained as above were placed one upon another between the press rollers 2 thus arranged, passed therethrough and applied a pressure of 30–40 MPa, to obtain a single electrode plate (electrode substrate 3) having a thickness of 1.28 mm.

Figure 2:
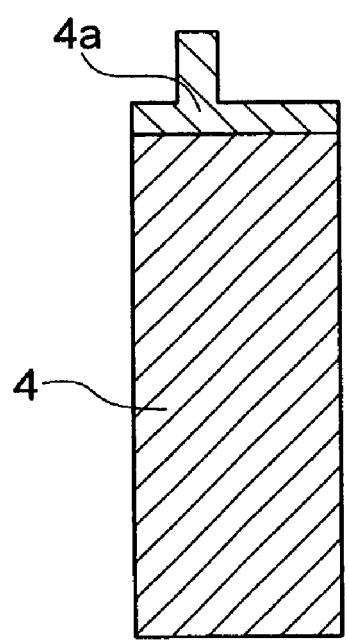
FIG. 2 is a plan view showing the positive electrode plate in the Example.
Figure 4:
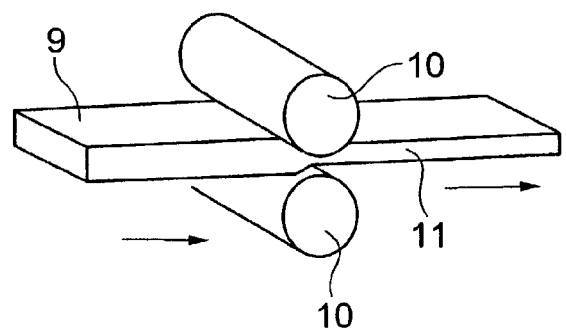
FIG. 4 is a schematic view showing a mechanism for forming a positive electrode plate in Comparative Example.

The electrode substrate 3 was cut to conform with the design of the battery to be constructed. In the present Example, the dimension of the electrode plate after cutting was 54 mm in height and 15 mm in width. Further, nickel lead 4a for current collection was welded thereto. Thus, a positive electrode plate 4 as shown in FIG. 2 and FIG. 4 was prepared.

Then, separator-sealing was applied to the positive electrode plate 4. A separator 4 made of polypropylene nonwoven fabric was made into the form of a bag by heat welding, and the positive electrode plate 4 was placed in the bag.

Separately, a negative electrode plate 6 was prepared as follows. To hydrogen absorbing alloy powder were added water, carboxymethyl cellulose, SBR (styrene-butadiene copolymer) and carbon as a conductive material and the resulting mixture was made into the form of paste. The paste was coated on the both sides of a punched metal core material of nickel-plated iron, dried, then the coated core material was press-rolled and cut to a dimension of 113 mm in length and 15 mm in width, to obtain the negative electrode plate 6.

Two positive electrode plates 4 which have been subjected to separator-sealing and two negative electrode plates 6, obtained above, were combined in layers so as to oppose each other; during the operation, the negative electrode plate 6 was folded in two and the positive electrode plate 4 subjected to separator-sealing was arranged so as to be held therebetween. Then, a lead part was welded so that the positive electrode plates could electrically communicate with each other. Thus, an electrode assembly was prepared.

Figure 3:
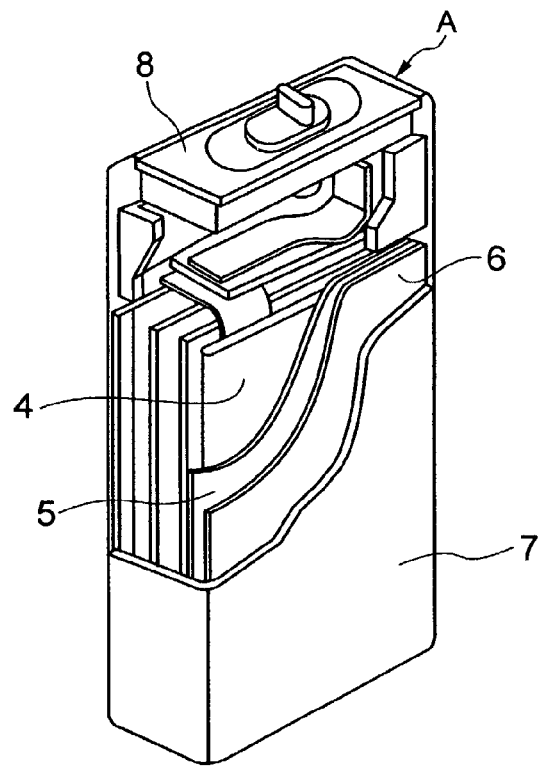
FIG. 3 is a partly sectional view of the battery of the Example.

The electrode assembly thus obtained was housed in a square-shaped case 7, an alkaline electrolyte comprising 6N KOH and 1N LiOH was poured thereinto, and the upper part of the case was tightly closed with a cover 8. Thus, 100 square-shaped nickel-hydrogen storage batteries A each having a theoretical capacity of 1,350 mAh of the Example of this invention were prepared. FIG. 3 shows the partly sectional view of the battery A.

Comparative Example

As an comparative example, a positive electrode active material paste was prepared in the same manner as described in Example.

The active material paste was filled into a strip-shaped foamed metallic porous body having three-dimensionally continuous space and a thickness of 2.3 mm and dried to obtain a material-filled substrate 9. Then, as shown in FIG. 4, press rollers 10 each made of steel and having a diameter of 450 mm were arranged on the upper side and the lower side with a gap between the upper side and the lower side press rollers 10 set at 1.1 mm. The active material-filled substrate 9 was passed between the press rollers 10 thus arranged, to obtain an electrode substrate 11 having a thickness of 1.28 mm.

The electrode substrate 11, in the same manner as described in Example, was cut, a nickel lead for current collection was welded thereto, and then the resulting electrode substrate was placed inside a separator made of polypropylene nonwoven fabric and worked into the form of a bag by heat welding. Thus, a positive electrode plate was prepared.

Separately, a negative electrode plate was prepared in the same manner as described in Example.

The positive electrode plate and the negative electrode plate were assembled according to the same method as described in Example to form an electrode assembly, which was then housed in a square-shaped case. In the same manner as in Example, an alkaline electrolyte was poured into the case and the opening was closed. Thus, 100 square-shaped nickel-hydrogen storage batteries B each having a theoretical capacity of 1,350 mAh of Comparative Example were prepared.

The batteries of Example and Comparative Example, respectively 100 units, were disassembled and examined for the occurrence rate of cracking and breaking of the positive electrode foamed metallic porous body, the occurrence rate of falling off of the positive electrode active material, and the fluctuation of the amount of active material filled in the positive electrode plate. The results of examination are shown in Table 1.

TABLE 1

|  | Example | Comparative Example |
| --- | --- | --- |
| Occurrence rate of cracking and breaking of foamed metallic porous body | 0.0% | 2.0% |
| Occurrence rate of falling off of positive electrode active material | 0.0% | 3.0% |
| Fluctuation of filled amount of positive electrode active material | 2.0% | 5.0% |

As shown in Table 1, in Comparative Example the occurrence rate of cracking and breaking of the positive electrode metallic porous body is 2.0% and the occurrence rate of falling off of the positive electrode active material is as high as 3.0%, whereas in Example they are both 0.0%, excellent results. As for the fluctuation of filled amount of the positive electrode active material, it is 5.0% in Comparative Example and 2.0% in Example, thus the fluctuation of filled amount in Example is as much as 3.0% lower than in Comparative Example.

This invention can be applied not only to a square-shaped battery in which the electrode assembly is constructed in a layer structure shown in Example but also to a wide variety of alkaline storage batteries, for example a cylindrical battery in which the electrode assembly is constructed in the form of coil and a pocket-type battery, and to a lead storage battery.

As set forth above, according to this invention, the thickness of the foamed metallic porous body used for the positive electrode plate can be decreased, whereby the preparation of the metallic porous body itself becomes easy and its cost can be reduced. Furthermore, by decreasing the thickness of the foamed metallic porous body, the packing property in filling the active material paste is improved, the cracking and breaking of the metallic porous body can be decreased, and the peeling and separation of the active material can be suppressed. Consequently, the occurrence of internal short-circuit due to the metallic porous body and internal short-circuit due to falling off of the active material can be suppressed.

Accordingly, by application of the present invention, even in batteries of high capacity type, defects in the production process can be greatly reduced, and a high productivity and improved yield can be achieved.

What is claimed is:

1. A process for producing an alkaline storage battery comprising:

an active material filling step of filling an active material paste prepared by kneading an active material comprising nickel hydroxide as the principal component together with water and a bonding agent, or an active material powder comprising nickel hydroxide as the principal component, into metallic porous body substrates having three-dimensionally continuous space to form positive electrode plates, a step of placing at least two positive electrode plates obtained above one upon another and thereafter pressing them to give a single positive electrode plate, a step of constructing an electrode assembly by placing the resulting positive electrode plate and a negative electrode plate so as to oppose each other with a separator interposed therebetween, and a step of housing the electrode assembly in a vessel.

* * * * *